Sept. 11, 1934.　　　S. H. HOBSON　　　1,973,072
COVER FOR COOKING TOPS
Filed Dec. 31, 1931　　　2 Sheets-Sheet 1

Inventor:
By Stanley H. Hobson

Sept. 11, 1934.  S. H. HOBSON  1,973,072
COVER FOR COOKING TOPS
Filed Dec. 31, 1931   2 Sheets-Sheet 2
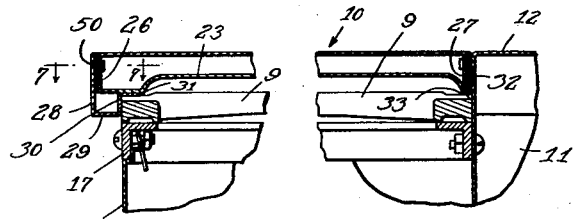
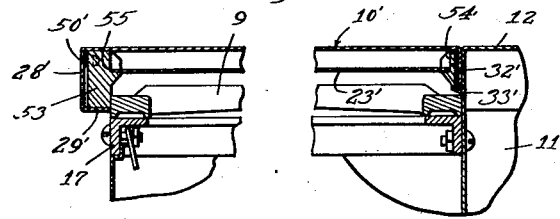
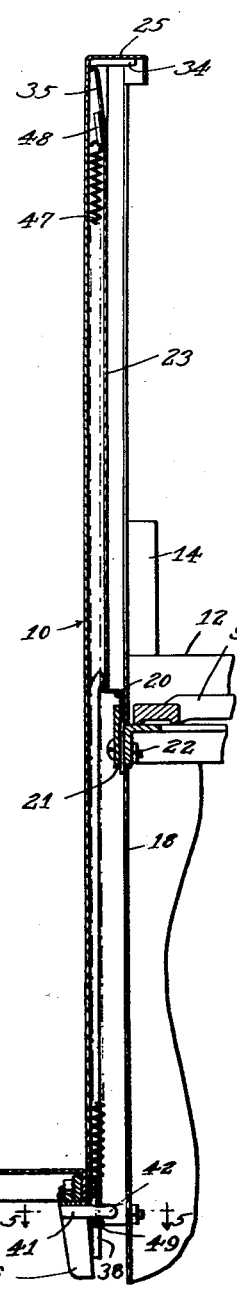
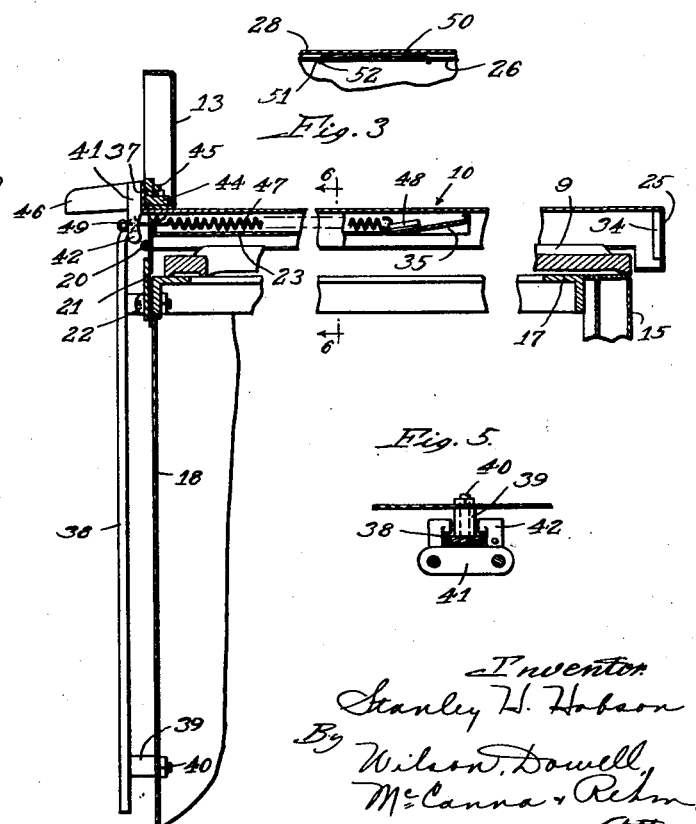

Patented Sept. 11, 1934

1,973,072

UNITED STATES PATENT OFFICE 1,973,072

COVER FOR COOKING TOPS

Stanley H. Hobson, Rockford, Ill., assignor to Geo. D. Roper Corporation, Rockford, Ill., a corporation of Illinois Application December 31, 1931, Serial No. 584,150

17 Claims. (Cl. 126—214)

This invention relates to gas ranges, and has particular reference to a hinged cover for the cooking top on ranges of table top design, where it is desired to have the cover serve as a splasher-back wall when raised.

Table top ranges usually have the cover simply hinged to be raised to vertical position to serve as a splasher back. Because of its size, the cover presents a rather awkward appearance in raised position. It is, therefore, the princpal object of my invention to provide a cover mounted not only to swing upwardly but to slide downwardly behind the range so that just enough is left exposed to serve as a splasher back, but not enough to detract from the appearance of the range.

It is another object of my invention to provide a guide with relation to which the cover when raised must slide, whereby to make it necessary to first raise the cover before sliding the same. This keeps the cover from being moved into contact with the wall behind the range.

Other objects, such as the provision of spring. means to counterbalance the cover so as to make for easy sliding thereof, and means for exerting a frictional drag on the movement of the cover so as to keep the cover from working too freely, will be discussed along with the above objects in the course of the following description. In said description, reference is made to the accompanying drawings in which—

Fig. 3 is a vertical section in the plane of the line 3—3 of Fig. 1 showing the cover closed, portions of the structure being broken away to permit showing the parts on a larger scale;

Fig. 4 is a similar section showing the cover raised and slid down;

Fig. 5 is a sectional detail on the line 5—5 of Fig. 4;

Fig. 6 is a cross-section on the line 6—6 of Fig. 3 with portions broken away for the reason mentioned before;

Fig. 7 is a sectional detail on the line 7—7 of Fig. 6, and

Fig. 8 is a view similar to Fig. 6, showing a modified construction.

Similar reference numerals are applied to corresponding parts throughout the views.

Figure 1:
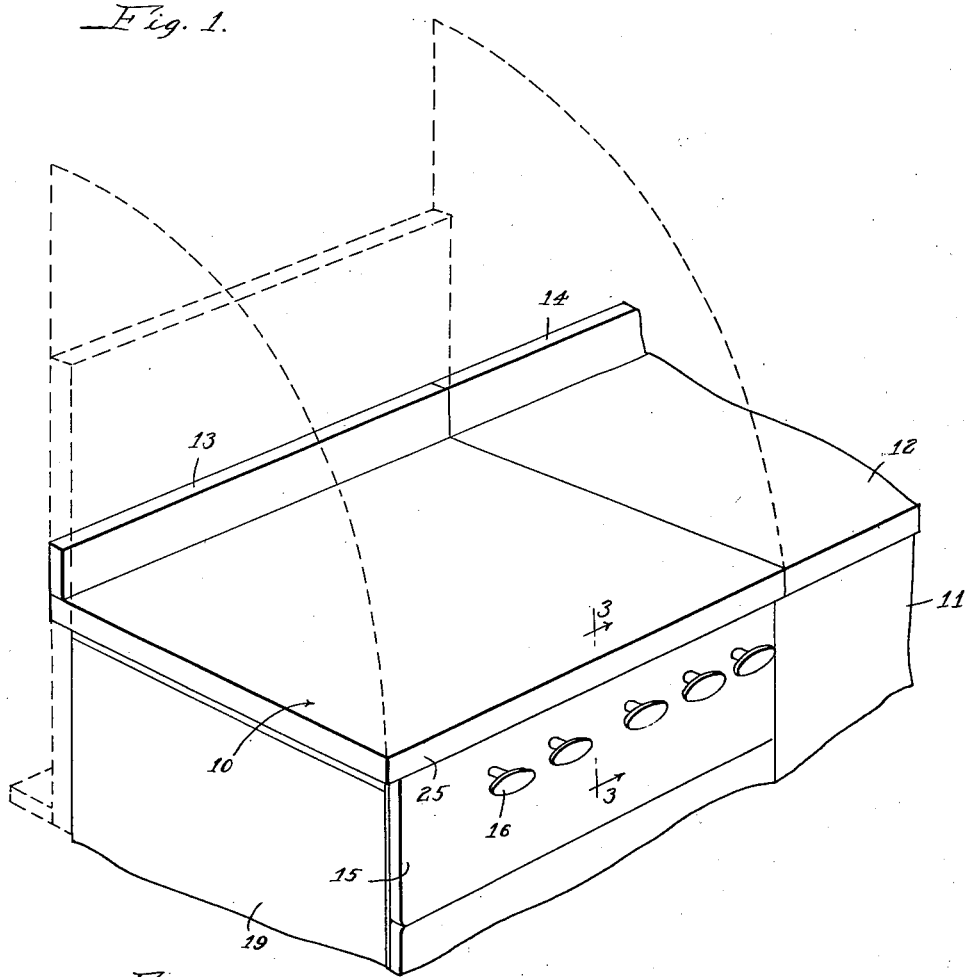
Figure 1 is a fragmentary perspective view of a cooking top section of a table top range embodying my invention.

Fig. 1 illustrates a range of what is known as a table top design, in which the cooking top 9 (see Fig. 3) under the cover, designated generally by the reference numeral 10, is provided at the usual height, but in which the oven section 11 is brought down far enough so that the top 12 thereof is approximately in the same horizontal plane as the cooking top, so that the cover 10 in closed position comes flush with the top 12 of the oven section. 13 is a back rail projecting upwardly from the rear edge of the cover 10 and disposed in alignment with a similar rail 14 on the top 12, simply to serve as a back board for the sake of appearance. A front panel 15 for the burner box, in which the cooking top burners are housed, serves as a closure for said box and conceals a manifold on which the usual gas cocks, operable by means of the knobs 16, are mounted. The cooking top 9 is made up of the usual grates supported on the top frame 17. 18 is a sheet metal back wall, and 19 a sheet metal side wall suitably secured to the frame of the range of which the top frame 17 forms a part.

Figure 2:
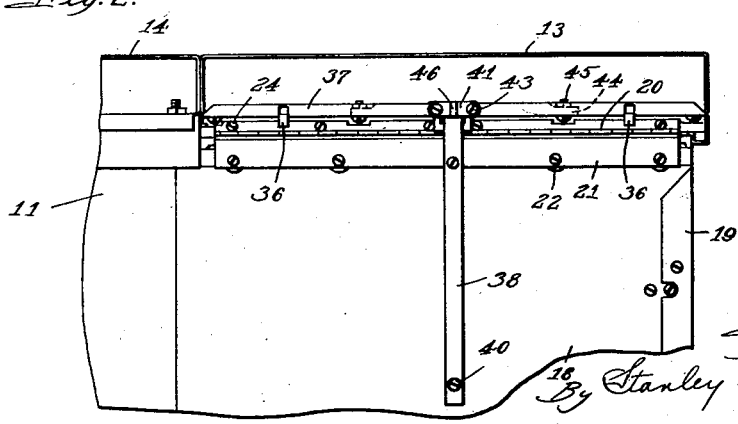
Fig. 2 is a rear view of Fig. 1.

A piano type hinge 20 carried on a plate 21, bolted as at 22 to the back of the top frame 17, provides a hinge support for the cover 10, permitting the same to be raised as indicated by the dotted line arcs in Fig. 1. A splasher-back panel 23 on which the cover 10 is slidable, as will soon appear, has the free leaf of the hinge 20 fastened thereto as by means of bolts 24, whereby to permit the cover 10, once it has been raised, to be slid downwardly behind the range to the dotted line position shown in Fig. 1. The cover is slid down far enough to bring the front flange 25 in abutment with the end of the panel 23. The latter is suitably formed and finished on the outside with enamel to match the rest of the stove so that when it is serving as a splasher back, as in Fig. 4, the stove presents a good appearance. The panel 23 is made only large enough to serve the purpose of a splasher back and does not detract from the appearance of the stove like a full sized cover does in raised position. As clearly appears in Fig. 6, which shows a cross-section through the cover, the lateral edges of the panel 23 are defined by upturned flanges 26 and 27, and the cover 10 has its lateral edges conformed so that the cover is guided for sliding movement on the panel 23. Thus, the one edge is defined by a down-turned flange 28 extending alongside the flange 26 and having its lower edge bent inwardly as at 29, upwardly as at 30, and inwardly again as at 31 to completely enclose the side of the panel 23 and permit of sliding movement with respect thereto, and also to fit down over the sides of the cooking top 9 when the cover is closed. The other side of the cover 10 simply has a down-turned flange 32 the lower edge of which is bent inwardly as at 33 to enclose the side of the panel 23 and likewise permit of sliding movement of the cover relative to said panel. As stated before, the sliding movement of the cover 10 in one direction is limited by the engagement of the front flange 25 of the cover with the end of the panel 23. A bumper 34 of rubber or felt is preferably provided on the inside of the flange 25 to cushion the engagement of the parts. The panel 23 has the end thereof bent upwardly as at 35 toward the inside of the cover 10 so that there is no shoulder of sufficient size presented on the end of the panel where one might pinch his fingers when the cover is slid down to the position shown in Fig. 4. Sliding movement of the cover in the opposite direction is limited by engagement of downwardly projecting lugs 36 on the cover with the back of the hinge 20. These lugs, as shown in Fig. 2, are punched from the upturned flange 37 provided on the rear end of the cover. The cover, when it is to be closed, is first slid upwardly on the panel 23 as far as it will go, and is then swung forwardly and downwardly over the cooking top, the downturned flange 25 on the front end of the cover being formed so that it clears the front end of the cooking top, thereby allowing the cover to come to rest on the cooking top on its flanges 31 and 33. In the closed position of the cover, the flange 25 conceals the front end of the cooking top so as to present a neat appearance.

The cover 10 cooperates with a vertical guide 38 on the back of the range to prevent sliding movement thereof in any position except vertical, whereby to avoid danger of having the cover brought into contact with the wall behind the range, it being, of course, the usual practice to place the range so close to the wall that such a thing would be apt to occur. The guide 38 is in the form of a bar fastened in spaced relation to the back wall 18 by means of spacers 39 and bolts 40. A bracket 41 fastened in abutment with the back of the flange 37 on the cover has runners 42 disposed to slide along the opposite sides of the guide 38. In that way, it is impossible for the cover 10 to be slid on the panel 23 in either direction except when the cover and panel are disposed in vertical position. The bracket 41 is made quite rigid with the cover by having bolts 43 passing through the flange 37 into a heavy bar 44 fitting in the back rail 13, as shown in Fig. 3, and bolted as at 45 to the cover 10, the bolts being passed through the cover 10 from the inside and through a flange on the rail 13 and through holes in the bar 44. This rigidity of the bracket 41 is important for the reason that it is relied upon to hold the cover 10 and panel 23 rigidly in raised position. By reference to Fig. 4, it is evident that the runners 42 prevent forward movement by virtue of their engagement on one side of the guide 38, and the projection 46 on the bracket 41 serves, by engagement with the other side of the guide 38, to prevent rearward movement.

Any suitable means may be provided for counterbalancing the cover to facilitate the sliding movement thereof. I have illustrated a long coiled tension spring 47, one end of which is fastened as at 48 to the front end of the panel 23, and the other end of which is fastened to the rear end of the cover 10 as at 49, the latter connection being on the bracket 41 carried on the cover, as previously described. The spring 47 is stretched as the cover 10 is slid downwardly behind the range, and it therefore requires proportionately less effort to slide the cover upwardly afterward when the cover is to be closed. The fact that a counterbalancing spring is provided also prevents the cover from sliding downwardly under its own weight when the same has been raised. However, dropping of the cover could be prevented in another way simply by use of friction means to place a drag on the sliding of the cover 10 on the panel 23, such as the bowed leaf springs 50, one of which is shown in Fig. 7 as disposed between the flange 26 of the panel 23 and the flange 28 of the cover 10. Holes 51, provided in the flange 26, receive the bent ends 52 of the spring to hold the spring in a predetermined position on the panel 23. Four of these springs are usually provided, two on each side of the cover, although, of course, any other suitable number could be used. I prefer to provide these springs 50 along with the counterbalancing spring 47 because there might otherwise be danger of the cover working too freely. In other words, the provision of the springs 50 facilitates matters from the manufacturing standpoint because it makes it unnecessary to work to such close limits in the making of the sheet metal parts, the cover being made to slide substantially with the same ease on every stove regardless of such slight variations in size of parts as may occur.

Instead of forming flanges 30 and 31 on the cover 10 and providing the flanges 26 and 27 on the panel 23, I contemplate providing cast rails 53 and 54, as shown in the cover 10' in Fig. 8. The panel 23', in this case, can be in the form of a flat piece of sheet metal adapted to fit in recesses 55 in the side rails 53 and 54. It is then only necessary to provide flanges 28' and 29' on the one side of the cover 10' to mount the cover on the panel for sliding movement relative thereto. A flange 32', corresponding to the flange 32 in Fig. 6, is provided on the other side of the cover 10', and has an inturned edge 33' to cooperate with the side rail 54 to mount the cover on the panel for sliding movement. In this case, as in the other, leaf springs 50' will be provided for frictionally engaging the inside of the flanges 28' and 32', the same being indicated in Fig. 8 as carried on the side rails 53 and 54.

I claim:

1. In a gas range comprising a cooking top, a splasher back panel hingedly mounted at the back of the cooking top to swing from a substantially horizontal position over the cooking top to a substantially vertical position to serve as a splasher back during use of the cooking top, and a cover for the cooking top slidably mounted on the back of the aforesaid panel and movable from a position covering the cooking top to a substantially vertical position with said panel, said cover being adapted to be slid downwardly behind the range.

2. In a gas range comprising a cooking top, a splasher back panel hingedly mounted at the back of the cooking top to swing from a substantially horizontal position over the cooking top to a substantially vertical position to serve as a splasher back during use of the cooking top, a cover slidably mounted on the back of said panel to swing with it from a position covering the cooking top to a vertical position, and means for holding said cover against sliding movement except when the same is raised with the panel to a predetermined point, said cover being arranged to slide downwardly behind the range leaving only the aforesaid panel exposed.

3. In a gas range comprising a cooking top, a splasher back panel hingedly mounted at the back of the cooking top to swing from a substantially horizontal position over the cooking top to a substantially vertical position to serve as a splasher back during use of the cooking top, a cover slidably mounted on the back of said panel to swing with it from a position covering the cooking top to a vertical position, an elongated vertical guide on the back of the range, and means on the cover movable along said guide when the cover is raised with the panel to substantially vertical position, said guide cooperating with said means to prevent sliding movement of the cover before it is raised to substantially vertical position.

4. In a gas range comprising a cooking top, a splasher back panel hingedly mounted at the back of the cooking top to swing from a substantially horizontal position over the cooking top to a substantially vertical position to serve as a splasher back during use of the cooking top, a cover slidably mounted on the back of said panel to swing with it from a position covering the cooking top to a vertical position, a vertical guide bar mounted on the back of the range, runner means on the cover slidable along the inside of said bar whereby to prevent sliding movement of the cover on the panel before the cover and panel have been raised to substantially vertical position, said runner means also serving by cooperation with said guide when the cover and panel are in vertical position to hold the panel and cover against forward swinging movement, and other means on the cover for engaging the outside of the bar when the cover and panel are in vertical position to hold the latter against rearward swinging movement.

5. In a gas range comprising a cooking top, a splasher back panel hingedly mounted at the back of the cooking top to swing from a substantially horizontal position over the cooking top to a substantially vertical position to serve as a splasher back during use of the cooking top, and a cover for the cooking top slidably mounted on the back of the aforesaid panel and movable from a position covering the cooking top to a substantially vertical position with said panel, said cover being adapted to be slid downwardly behind the range, and spring means housed between the panel and cover and placed under tension in the sliding movement of the cover in one direction, the same being thereby adapted to facilitate the return movement.

6. In a gas range comprising a cooking top, a splasher back panel hingedly mounted at the back of the cooking top to swing from a substantially horizontal position over the cooking top to a substantially vertical position to serve as a splasher back during use of the cooking top, and a cover for the cooking top slidably mounted on the back of the aforesaid panel and movable from a position covering the cooking top to a substantially vertical position with said panel, said cover being adapted to be slid downwardly behind the range, and a coiled tension spring housed between the panel and cover and connected at one end to the panel and at the other end to the cover in such a way as to counterbalance the cover in its sliding movement relative to the panel, the same resisting downward sliding movement and aiding upward movement of said cover relative to the panel.

7. In a gas range comprising a cooking top, a splasher back panel hingedly mounted at the back of the cooking top to swing from a substantially horizontal position over the cooking top to a substantially vertical position to serve as a splasher back during use of the cooking top, and a cover for the cooking top slidably mounted on the back of the aforesaid panel and movable from a position covering the cooking top to a substantially vertical position with said panel, said cover being adapted to be slid downwardly behind the range, and means for counterbalancing the cover in its sliding movement relative to the panel.

8. In a gas range comprising a cooking top, a splasher back panel hingedly mounted at the back of the cooking top to swing from a substantially horizontal position over the cooking top to a substantially vertical position to serve as a splasher back during use of the cooking top, and a cover for the cooking top slidably mounted on the back of the aforesaid panel and movable from a position covering the cooking top to a substantially vertical position with said panel, said cover being adapted to be slid downwardly behind the range, and means for counterbalancing the cover in its sliding movement relative to the panel, said means being disposed in concealment between the panel and cover.

9. In a gas range comprising a cooking top, a splasher back panel hingedly mounted at the back of the cooking top to swing from a substantially horizontal position over the cooking top to a substantially vertical position to serve as a splasher back during use of the cooking top, and a cover for the cooking top slidably mounted on the back of the aforesaid panel and movable from a position covering the cooking top to a substantially vertical position with said panel, said cover being adapted to be slid downwardly behind the range, and means in the sliding joint between the cover and panel for placing a frictional drag on the sliding movement of the cover relative to the panel.

10. In a gas range comprising a cooking top, a splasher back panel hingedly mounted at the back of the cooking top to swing from a substantially horizontal position over the cooking top to a substantially vertical position to serve as a splasher back during use of the cooking top, and a cover for the cooking top slidably mounted on the back of the aforesaid panel and movable from a position covering the cooking top to a substantially vertical position with said panel, said cover being adapted to be slid downwardly behind the range, and resilient means compressed in the sliding joint between the cover and panel serving to frictionally impede the sliding movement of the cover relative to the panel.

11. In a gas range comprising a cooking top, a splasher back panel hingedly mounted at the back of the cooking top to swing from a substantially horizontal position over the cooking top to a substantially vertical position to serve as a splasher back during use of the cooking top, and a cover for the cooking top slidably mounted on the back of the aforesaid panel and movable from a position covering the cooking top to a substantially vertical position with said panel, said cover being adapted to be slid downwardly behind the range, and one or more bowed leaf springs compressed in the sliding joint between the cover and panel and held in place on one of said parts, whereby to keep the cover from working too freely on the panel and to afford frictional drag on the movement of said cover.

12. In a gas range comprising a cooking top, a splasher back panel hingedly mounted at the back of the cooking top to swing from a substantially horizontal position over the cooking top to a substantially vertical position to serve as a splasher back during use of the cooking top, a cover for the cooking top slidably mounted on the back of the aforesaid panel and movable from a position covering the cooking top to a substantially vertical position with said panel, said cover being adapted to be slid downwardly behind the range, said cover having a part thereon adapted to come into engagement with a part of the panel at the limit of the sliding movement of said cover, and means for cushioning the engagement of said parts.

13. In a gas range comprising a cooking top, a splasher back panel hingedly mounted at the back of the cooking top to swing from a substantially horizontal position over the cooking top to a substantially vertical position to serve as a splasher back during use of the cooking top, a cover for the cooking top slidably mounted on the back of the aforesaid panel and movable from a position covering the cooking top to a substantially vertical position with said panel, said cover being adapted to be slid downwardly behind the range, a downwardly projecting part on the rear end of said cover adapted to come into engagement with a part on the rear end of said panel to limit sliding movement of the cover in one direction, and a downwardly projecting flange on the front end of said cover adapted to conceal the front end of the cooking top when the cover is closed and also adapted, when the cover and panel are raised and the cover is slid down on the panel, to come into engagement with the end of the panel to limit the sliding movement of the cover.

14. In a gas range comprising a cooking top, a splasher back panel hingedly mounted at the back of the cooking top to swing from a substantially horizontal position over the cooking top to a substantially vertical position to serve as a splasher back during use of the cooking top, and a cover for the cooking top slidably mounted on the back of the aforesaid panel and movable from a position covering the cooking top to a substantially vertical position with said panel, said cover being adapted to be slid downwardly behind the range, said cover having a downwardly projecting front flange to conceal the front end of the cooking top when the cover is closed, said flange being also adapted, when the cover and panel are raised and the cover is slid down on the panel, to come into engagement with the front end of said panel to limit movement of said cover, said panel having its front end inclined to prevent pinching an object coming between said flange and the end of said panel at the limit of movement of the cover.

15. A range as set forth in claim 14 including a cushion pad on the inside of said flange to cushion the engagement of the parts.

16. In a gas range comprising a cooking top, a splasher back panel and cooking top cover hingedly mounted at the back of the cooking top, the panel and cover being swingable to a substantially horizontal position over the cooking top in which position the cover overlies the panel and conceals the same while covering the cooking top, and the panel and cover being swingable to a substantially vertical position, in which position the panel serves as a splasher back during use of the cooking top, the cover being slidable downwardly behind the panel in the vertical position of the latter.

17. In a gas range comprising a cooking top, a splasher back panel and cooking top cover hingedly mounted at the back of the cooking top, the panel and cover being swingable to a substantially horizontal position over the cooking top in which position the cover overlies the panel and conceals the same while covering the cooking top, and the panel and cover being swingable to a substantially vertical position, in which position the panel serves as a splasher back during use of the cooking top, the cover being of larger dimensions than the panel and projecting above the panel in the vertical position of the latter, but said projecting portion being movable downwardly behind the panel.

STANLEY H. HOBSON.